United States Patent
Woizeschke

(10) Patent No.: US 9,427,944 B2
(45) Date of Patent: Aug. 30, 2016

(54) TRANSFER LAMINATION

(71) Applicant: Assa Abloy AB, Stockholm (SE)

(72) Inventor: Michael Woizeschke, Shakopee, MN (US)

(73) Assignee: Assa Abloy AB, Stockholm (SE)

(*) Notice: Subject to any disclaimer, the term of this patent is extended or adjusted under 35 U.S.C. 154(b) by 0 days.

(21) Appl. No.: 14/778,263

(22) PCT Filed: Mar. 27, 2013

(86) PCT No.: PCT/US2013/034010
§ 371 (c)(1),
(2) Date: Sep. 18, 2015

(87) PCT Pub. No.: WO2014/158146
PCT Pub. Date: Oct. 2, 2014

(65) Prior Publication Data
US 2016/0101608 A1    Apr. 14, 2016

(51) Int. Cl.
*B29C 65/02* (2006.01)
*B32B 37/06* (2006.01)
(Continued)

(52) U.S. Cl.
CPC .............. *B32B 37/025* (2013.01); *B32B 37/06* (2013.01); *B32B 38/10* (2013.01); *B41M 3/12* (2013.01); *B41M 5/025* (2013.01); *B41M 5/0256* (2013.01); *B44C 1/1708* (2013.01); *B32B 7/06* (2013.01); *B32B 2425/00* (2013.01); *B32B 2429/02* (2013.01); *B41M 3/14* (2013.01);
(Continued)

(58) Field of Classification Search
CPC .......... B32B 2425/00; B32B 2429/02; B32B 37/025; B32B 37/06; B32B 38/10; B32B 7/06; B41M 5/025; B41M 3/12; B41M 3/14; B42D 15/02; B44C 1/1708; B44C 1/1712; G09F 3/00
USPC .................................................. 156/249, 277
See application file for complete search history.

(56) References Cited

U.S. PATENT DOCUMENTS

2005/0140768 A1    6/2005    Aspenns et al.

FOREIGN PATENT DOCUMENTS

| WO | 03039885 A1 | 5/2003 | |
|----|---|---|---|
| WO | WO 2011085174 A2 * | 7/2011 | ......... B32B 37/0046 |
| WO | 2014158146 A1 | 10/2014 | |

OTHER PUBLICATIONS

International Search Report and Written Opinion of PCT/US2013/034010, mailed Nov. 14, 2013.

*Primary Examiner* — Sonya Mazumdar
(74) *Attorney, Agent, or Firm* — Westman, Champlin & Koehler, P.A.

(57) ABSTRACT

A method of laminating a transfer section of a transfer layer to a substrate is performed using a reverse-image transfer printing device. The device includes a transfer ribbon, a print ribbon, a print head, and a laminating device. The transfer ribbon comprises the transfer layer, which is attached to a carrier layer. The print head is configured to transfer print material from the print ribbon to the transfer layer. Non-transfer portions of the transfer section are heated to a deactivation temperature using the print head. The transfer section is laminated to the substrate by heating the non-transfer portions and transfer portions of the transfer section using the laminating device. This bonds the transfer portions the substrate. The carrier layer is the removed from the transfer portions leaving the transfer portions bonded to the substrate. The non-transfer portions remain attached to the carrier layer.

14 Claims, 5 Drawing Sheets

(51) Int. Cl.
  *B32B 37/26* (2006.01)
  *B32B 38/14* (2006.01)
  *G09F 3/02* (2006.01)
  *B32B 37/00* (2006.01)
  *B41M 3/12* (2006.01)
  *B41M 5/025* (2006.01)
  *B32B 38/10* (2006.01)
  *B29C 65/48* (2006.01)
  *B44C 1/17* (2006.01)
  *B32B 7/06* (2006.01)
  *B42D 15/02* (2006.01)
  *B41M 3/14* (2006.01)
  *G09F 3/00* (2006.01)

(52) U.S. Cl.
  CPC ............ *B42D 15/02* (2013.01); *B44C 1/1712* (2013.01); *G09F 3/00* (2013.01)

TRANSFER LAMINATION

CROSS-REFERENCE TO RELATED APPLICATION

This Application is a Section 371 National Stage Application of International Application No. PCT/US2013/034010, filed Mar. 27, 2013 and published as WO 2014/158146 A1 on Oct. 2, 2014, in English, the contents of which is hereby incorporated by reference in its entirety.

BACKGROUND

Credentials include identification cards, driver's licenses, passports, and other documents. Such credentials are formed from credential or card substrates including paper substrates, plastic substrates, cards and other materials. Such credentials generally include printed information, such as a photo, account numbers, identification numbers, and other personal information. Credentials can also include data that is encoded in a smartcard chip, a magnetic stripe, or a barcode, for example.

Credential production devices process credential substrates by performing at least one processing step in forming a final credential product. One such process is a transfer or laminating process that transfers a material to a surface of the card substrate using a heated roller. This process can be used to transfer an image to the surface of the card substrate and/or provide protection to the surface of the card substrate from abrasion and environmental conditions, for example.

The material transferred to the surface of the card substrate using the heated roller is generally one of two types: a patch laminate, or a fracturable laminate or transfer layer often referred to as a "thin film laminate." The patch laminate is generally a pre-cut polyester film that has been coated with a thermal adhesive on one side. The pre-cut patch is removably attached to a continuous carrier layer which is generally a coated polyester material. The pre-cut patch is attached to the liner with the thermal adhesive side exposed and available for lamination to the substrate. The heated roller is used to heat the patch to activate the adhesive and press the patch to the surface of the substrate to bond the patch onto the surface.

One disadvantage to the use of a patch laminate is that it does not provide edge-to-edge protection to the surface of the card substrate because it must be formed slightly smaller than the surface of the card to ensure that the patch laminate does not extend beyond the card's edges. Another disadvantage to the use of the patch laminate appears when the surface of the card substrate requiring protection includes a feature over which the patch laminate should not be applied. Such features may include, for example, a magnetic stripe, a signature panel, a surface hologram feature, or electrical contacts of a smartcard module. In order to provide protection of graphics when these features are present, portions of the patch laminate must be removed prior to lamination to expose the feature. Further, it may be desirable to avoid heating some portions of the surface of the card substrate, something which is generally not possible using the heated roller.

Transfer layers are generally continuous resinous materials that have been coated onto a continuous carrier layer or backing to form a transfer ribbon. The side of the resin material that is not attached to the continuous carrier layer is generally coated with a thermal adhesive which is used to create a bond between the resin and the surface of the substrate. The heated roller is used to activate the adhesive and press the resinous material against the surface of the substrate to bond the material to the surface. The carrier layer or backing is removed to complete the lamination process.

The transfer layer may also be in the form of a print intermediate, on which an image may be printed in a reverse-image printing process. In the reverse-image printing process, an image is printed to the exposed side of the transfer layer. Next, the image on the transfer layer is registered with the card substrate. The heated roller is used to activate the adhesive on the imaged transfer layer causing the imaged transfer layer to bond to the surface of the card substrate. A backing of the overlaminate material is removed from the bonded imaged transfer layer to complete the transfer of the image to the card substrate.

The transfer layer provides a degree of protection to the surface of the substrate as well as the image printed on the transfer layer. Some transfer films include a protective layer that is configured to provide an additional level of protection to the surface and image. In general, the protective layer increases abrasion resistance, but can also provide protection from other environmental conditions, such as moisture, ultraviolet light, etc.

In most applications, the transfer ribbon is positioned to completely cover the surface of the substrate. Ideally, as the carrier layer is pulled from the portion of the transfer layer bonded to the surface of the substrate, the transfer layer fractures along the edges of the substrate. This results in the entire surface being covered by the transfer layer for full edge-to-edge protection of the surface. Unfortunately, the transfer layer does not always cleanly transfer to the substrate.

Edge flash occurs when the transfer film does not fracture properly along an edge of the substrate, such as the trailing edge, during the carrier peeling phase of the transfer lamination or reverse-image printing process. This results in portions of the transfer film remaining adhered to the carrier layer or the substrate that were respectively intended to bond to the substrate or the carrier layer, and defects in the processed substrate. Edge flash tends to be more problematic as the thickness of the transfer layer increases, such as due to a thick protective layer. As a result, the thickness of the transfer layer used in conventional transfer lamination processes and devices is limited to avoid edge flash issues. Unfortunately, this also limits the level of protection may be provided to the surface of the substrate by the transfer layer.

Sometimes full edge-to-edge coverage of the surface of the substrate with the transfer layer is not desired. For instance, it may be necessary to avoid covering certain features that may be present on the surface of the substrate, such as, for example, a magnetic stripe, a signature panel, and other features mentioned above. One technique that is used to prevent the transference of the transfer layer to select portions of the card surface involves the use of an inhibitor panel of a print ribbon. The inhibitor panel is positioned over the imaged transfer layer of the transfer ribbon, and the print head selectively activates portions of the inhibitor panel corresponding to portions of the imaged transfer layer that should be prevented from being transferred to the surface of the substrate. The activation of the selective locations of the inhibitor panel cause those activated portions of the inhibitor panel to adhere to the corresponding portions of the imaged transfer layer through the activation of the adhesive in the transfer layer. As the print ribbon is pulled away from the imaged transfer ribbon, the activated portions of the inhibitor layer remove the corresponding imaged transfer layer portions from the transfer ribbon. The transfer ribbon then includes the remaining imaged transfer layer which was not removed through bonding with the inhibitor layer of the print ribbon. The gaps in the imaged transfer layer on the transfer ribbon that correspond to the removed sections of the imaged transfer adhesive correspond to the locations of the features of the substrate where the transference of the transfer layer is undesired. Accordingly, the sections of the substrate where the transference of the imaged transfer layer is undesired remain free of the transfer layer following the transference of the imaged transfer layer from the transfer ribbon to the surface of the substrate using the heated roller.

As with edge flash, the thickness and durability of the transfer layer also affects the success of the above-described transfer layer removal process. For instance, thick transfer layers are subject to tearing during the transfer layer removal process resulting in the undesired removal of non-activated portions of the transfer layer and/or the failure to remove activated portions of the transfer layer. This prevents the substrate from receiving the desired portions of the imaged transfer layer, resulting in defects.

SUMMARY

Figure 1:
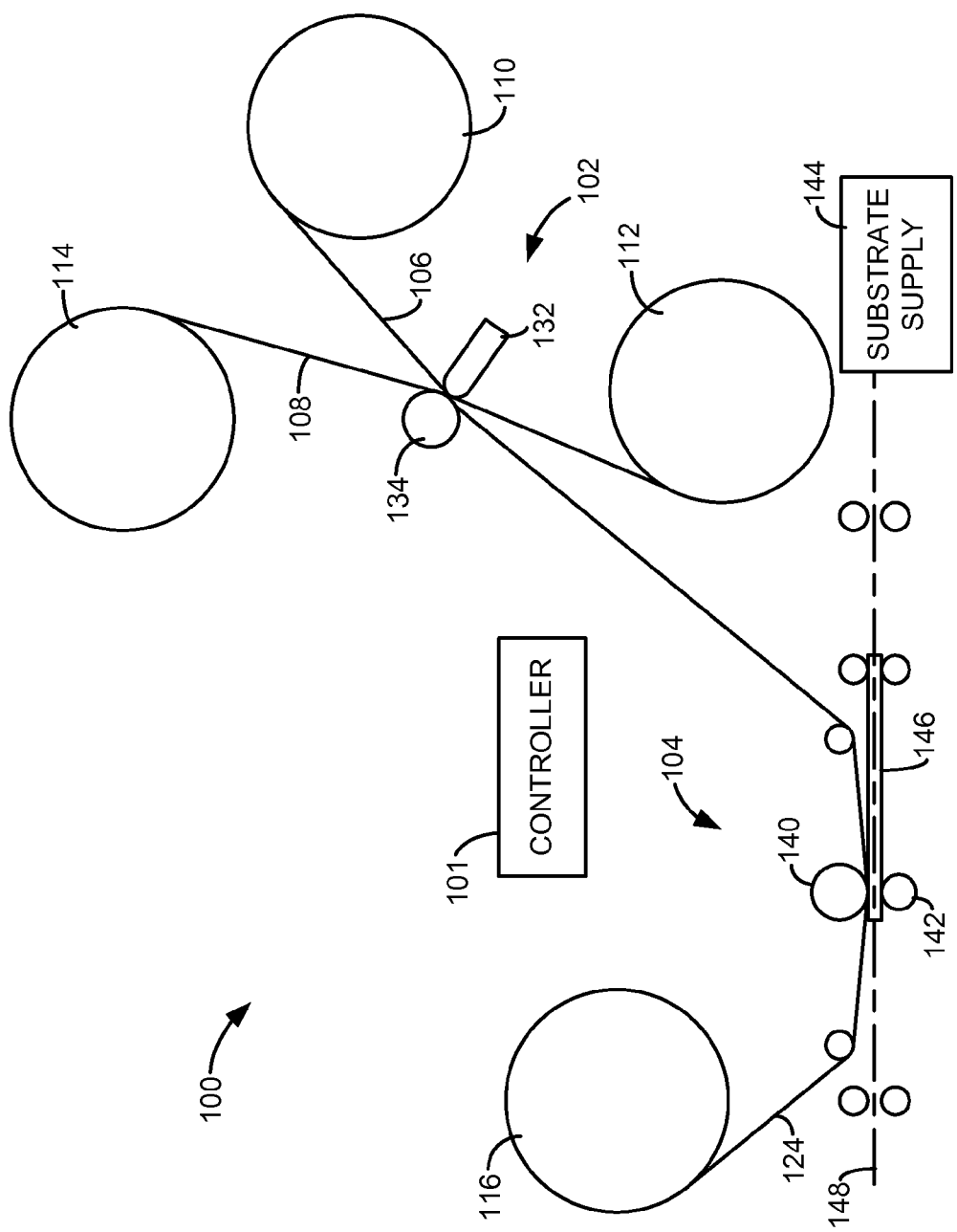
FIG. 1 is a simplified side view of an exemplary reverse-image transfer printing device in accordance with embodiments of the invention.

Embodiments of the invention are directed to methods of laminating a transfer section of a transfer layer to a substrate using a reverse-image transfer printing device. In some embodiments, the device includes a transfer ribbon comprising the transfer layer attached to a carrier layer, a print ribbon, a print head configured to transfer print material from the print ribbon to the transfer layer, and a laminating device. In some embodiments of the method, non-transfer portions of the transfer section are heated to a deactivation temperature using the print head. The transfer section is laminated to a substrate by heating the non-transfer portions and transfer portions of the transfer section using the laminating device, and bonding the transfer portions to the substrate using the laminating device. The carrier layer is then removed from the transfer portions while the non-transfer portions remain attached to the carrier layer.

In some embodiments, the non-transfer portions are heated through the print ribbon using the print head. In some embodiments, print material is not transferred to the non-transfer portions during the heating of the non-transfer portions. In some embodiments, the print ribbon includes a blank panel, and the non-transfer portions are heated through the blank panel. In some embodiments, print material is transferred from the print ribbon to the non-transfer portions during the heating of the non-transfer portions.

In some embodiments, an image is printed to the transfer section prior to laminating the transfer section to the substrate. In some embodiments, portions of the print ribbon are heated to a print temperature using the print head. Print material is transferred from the print ribbon to the transfer section in response to heating portions of the print ribbon to the print temperature. In some embodiments, the deactivation temperature is greater than the print temperature.

In some embodiments, the non-transfer portions of the transfer section correspond to a feature of the substrate. Embodiments of the feature include embedded circuitry, an electrical contact, a magnetic stripe, a signature panel, and/or a holographic image. In some embodiments, the transfer section laminated to the substrate includes openings over the one or more features of the substrate corresponding to the non-transfer portions.

In some embodiments, the substrate includes a leading edge, a trailing edge opposite the leading edge, and first and second opposing side edges extending between the leading and trailing edges. In some embodiments, the non-transfer portions of the transfer section include a leading edge portion of the transfer section corresponding to the leading edge of the substrate, a trailing edge portion of the transfer section corresponding to the trailing edge of the substrate, and/or side edge portions of the transfer section corresponding to the side edges of the substrate. This prevents or reduces the likelihood of edge flash issues. Additionally, a thicker transfer layer may be utilized to improve protection of the portions of the substrate that receive the transfer portions.

In another method of laminating a transfer section of a transfer layer to a substrate using a reverse-image transfer printing device, one or more transfer portions of the transfer layer adjoining at least one edge of the transfer section are heated to a deactivation temperature using the print head. The transfer section is laminated to a substrate by heating the transfer section using the laminating device, and bonding transfer portions of the transfer section to the substrate using the laminating device. The carrier layer is removed from the transfer portions, while the non-transfer portions remain attached to the carrier layer.

In some embodiments, the transfer section includes a leading edge, a trailing edge opposite the leading edge, and first and second opposing side edges extending between the leading and trailing edges. In some embodiments, the one or more transfer portions include a leading edge portion adjoining the leading edge of the transfer section, a trailing edge portion adjoining the trailing edge of the transfer section, and/or side edge portions each adjoining one of the side edges of the transfer section.

In some embodiments, the one or more non-transfer portions of the transfer layer are heated through the print ribbon using the print head. In some embodiments, print material is not transferred to the non-transfer portions in response to heating the non-transfer portions through the print ribbon using the print head.

In some embodiments of the method, non-transfer portions of the transfer section are heated to the deactivation temperature using the print head. During the lamination of the transfer section, the non-transfer portions and the transfer portions of the transfer section are heated using the laminating device, and the transfer portions are bonded to the substrate using the laminating device. The non-transfer portions of the transfer section remain attached to the carrier layer following removing the carrier layer from the transfer portions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

FIG. 1 is a simplified side view of an exemplary transfer lamination or reverse-image transfer printing device 100 in accordance with embodiments of the invention. In some embodiments, the device 100 includes a controller 101 representing one or more processors configured to execute program instructions stored in local memory of the device, or other location to control components of the device 100 and perform method steps described herein.

In some embodiments, the device 100 includes a printing section 102 and a transfer laminating section 104. The device 100 also includes a print ribbon 106 and a transfer ribbon 108. In some embodiments, the print ribbon 106 is supported between a supply spool 110 and a take-up spool 112. In some embodiments, the transfer ribbon 108 is supported between a supply spool 114 and a take-up spool 116.

Figure 2:
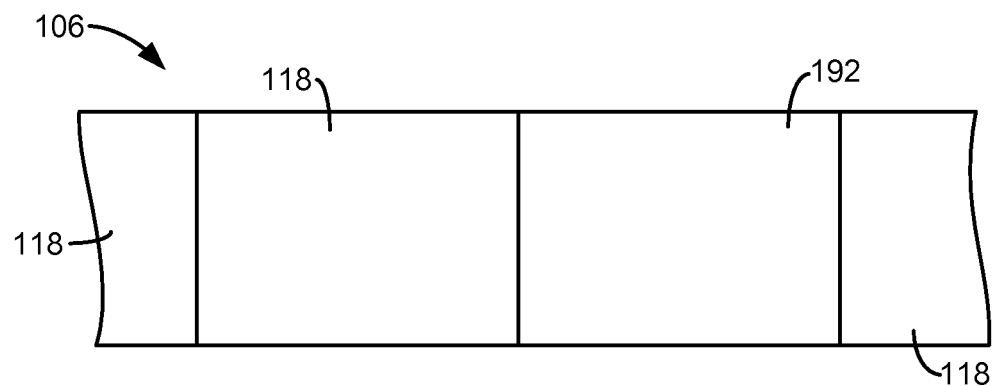
FIG. 2 is a simplified top plan view of a print ribbon in accordance with embodiments of the invention.

FIG. 2 is a simplified top plan view of a print ribbon 106 in accordance with embodiments of the invention. In some embodiments, the print ribbon 106 comprises a plurality of print panels, such as colored dye panels, a black resin panel, and/or other conventional thermal print ribbon print panels. The print panels 118 comprise print material (e.g., dye, ink, resin, etc.) that may be transferred to the transfer ribbon 108 during a printing process performed by the printing section 102.

Figure 3:
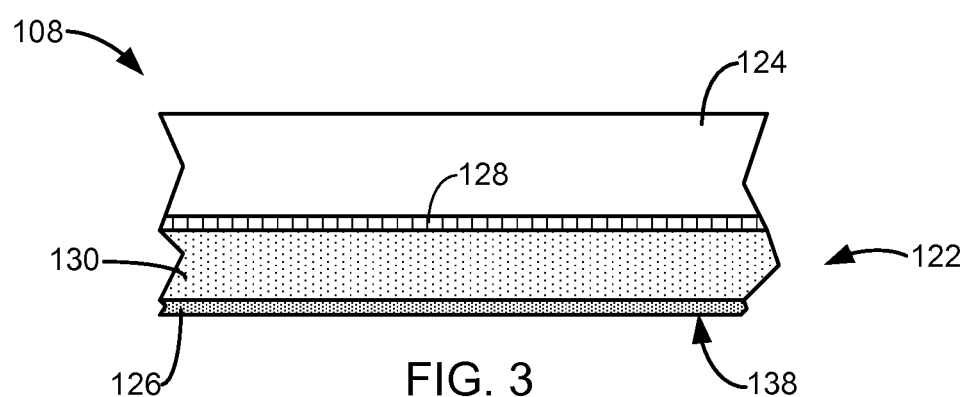
FIG. 3 is a simplified side cross-sectional view of a transfer ribbon in accordance with embodiments of the invention.

FIG. 3 is a simplified side cross-sectional view of a transfer ribbon 108 in accordance with embodiments of the invention. In some embodiments, the transfer ribbon 108 includes a transfer layer 122, which is attached to a backing or carrier layer 124. In some embodiments, the transfer layer 122 is in the form of a fracturable laminate or thin film laminate. In some embodiments, the transfer layer 122 includes an image receptive layer 126 that is configured to receive print material from the print ribbon 106. In some embodiments, the image receptive layer 126 comprises a thermal adhesive, which is activated during a transfer lamination process to bond the transfer layer 122 to a substrate. The transfer ribbon 108 may also include a release layer 128 between the transfer layer 122 and the carrier layer 124 that assists in releasing the transfer layer from the carrier layer 124 during a transfer lamination process. Other conventional materials or layers may also be included in the transfer ribbon 108.

In some embodiments, the transfer layer 122 includes a protective layer 130 located between the image receptive layer 126 and the carrier layer 124. Alternatively, the protective layer 130 may be combined with the image receptive layer 126. The protective layer 130 operates to provide protection to an image printed on or in the image receptive layer 126 when the transfer layer 122 is laminated to a surface of a substrate. The protective layer 130 can also provide protection to the surface of the substrate on which it is laminated.

In some embodiments, the protective layer 130 is a highly durable protective layer that is capable of withstanding 1500 taber cycles. In some embodiments, the protective layer 130 is capable of withstanding 2000-3000 or more taber cycles. In some embodiments, the protective layer 130 includes one or more resins. In some embodiments, the protective layer 130 has a thickness in the range of 12-40 μm. In some embodiments, the protective layer 130 has a thickness of greater than 25 μm. Embodiments of the protective layer also include other configurations.

Embodiments of the printing section 102 of the device 100 will be described with reference to FIGS. 4 and 5, which respectively are simplified side and front views of the printing section 102 in accordance with embodiments of the invention. The printing section 102 may be formed in accordance with conventional printing sections of reverse-transfer printing devices. In some embodiments, the printing section 102 includes a print head 132 and a print platen or other support 134 (hereinafter "platen 134"). In some embodiments, the print head 132 is a thermal print head comprising heating elements 136 that may be individually activated to heat a desired portion of the print ribbon 106 using the controller 101, as illustrated in FIG. 5. During a conventional print operation, the activated heating elements 136 (shaded boxes) each heat an underlying portion of a print panel 118 of the print ribbon 106 to a print temperature, causing print material to transfer from the print panel 118 to the surface 138 (FIG. 3) of the transfer layer 122. In some embodiments, the print temperature is in the range of 65-150° C. Multiple print panels 118 of the print ribbon 106 may be fed into position using conventional techniques to print the desired image to the transfer layer 122 of the transfer ribbon 108.

Figure 6:
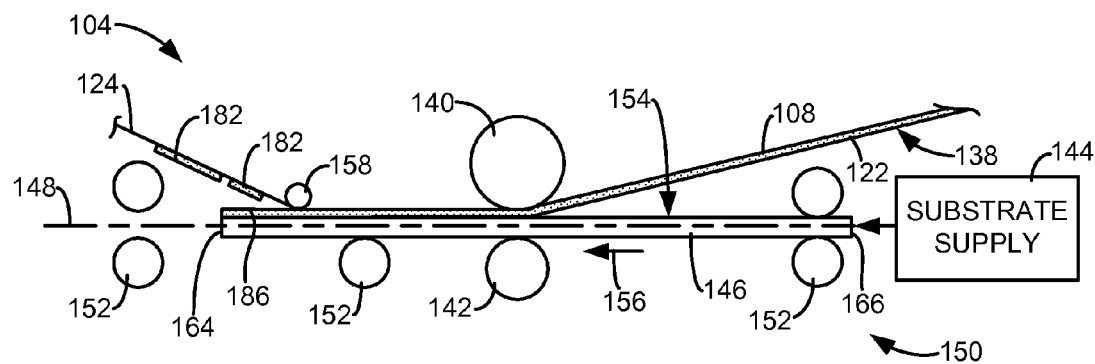
FIG. 6 is a simplified side view of a transfer laminating section of the device of FIG. 1 in accordance with embodiments of the invention.

FIG. 6 is a simplified side view of a transfer laminating section 104 of the device 100 in accordance with embodiments of the invention. The transfer laminating section 104 may be formed in accordance with conventional laminating sections of reverse-transfer printing devices. In some embodiments, the transfer laminating section 104 includes a laminating device 140, such as a heated laminating roller, and a platen or other support 142 (hereinafter "platen 142"). In some embodiments, the device 100 includes a substrate supply 144, from which individual substrates 146 are fed along a processing path 148 toward the laminating device 140 using a suitable transport mechanism 150 controlled by the controller 101. In some embodiments, the transport mechanism 150 comprises one or more motorized feed rollers 152, or other suitable mechanism. Embodiments of the transfer laminating section 104 include sensors (not shown) that may be used to assist the controller 101 in the feeding of the substrates 146 along the processing path 148, and aligning the substrates 146 with a transfer section of the transfer layer 122 that is to be laminated to a surface 154 of the substrate 146.

In some embodiments, the transfer ribbon 108 and the substrate 146 are fed between the laminating device 140 and the platen 142, as shown in FIG. 6. As the substrate 146 and the transfer ribbon 108 are fed in the direction indicated by arrow 156, the controller 101 controls the laminating device 140 to heat the transfer ribbon 108 and presses the transfer layer 122 against the surface 154 of the substrate 146. The heating of the transfer ribbon 140 generally activates the adhesive within the transfer layer 122, which bonds the transfer layer 122 to the surface 154 of the substrate 146. In some embodiments, the carrier layer 124 is pulled from the transfer layer 122 bonded to the substrate 146 at a peel-off roller 158 and is collected by the take-up spool 116.

The transfer lamination process is completed after the substrate 146 is fed sufficiently past the laminating device 140, leaving the substrate with a transfer section of the transfer layer 122 bonded to the surface 154. An image printed either to the surface 138 of the transfer layer 122, or to the surface 154 of the substrate 146 prior to the lamination process, is protected by the transfer layer 122, specifically the protective layer 130.

The substrate 146 may take on many different forms, as understood by those skilled in the art. In some embodiments, the substrate 146 is a credential substrate. As used herein, the term "credential substrate" includes substrates used to form credentials, such as identification cards, membership cards, proximity cards, driver's licenses, passports, credit and debit cards, and other credentials or similar products. Exemplary card substrates include paper substrates other than traditional paper sheets used in copiers or paper sheet printers, plastic substrates, rigid and semi-rigid card substrates, and other similar substrates.

Figure 7:
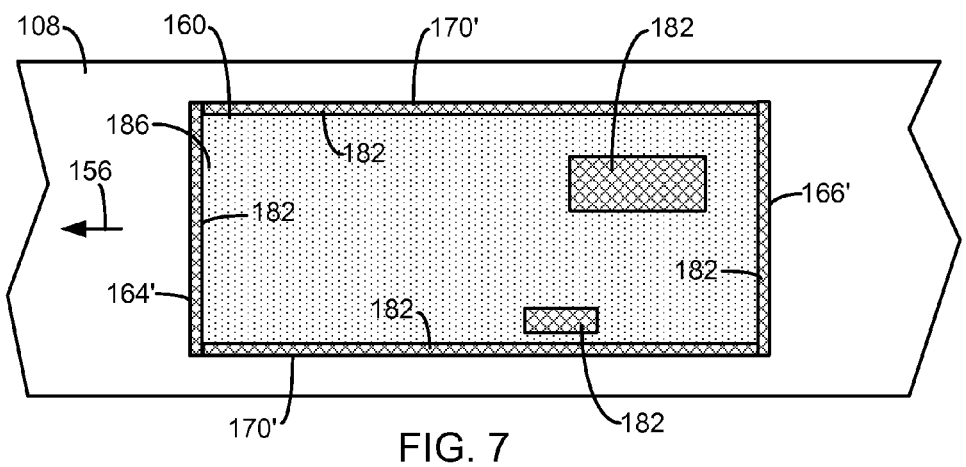
FIG. 7 is a simplified top view of a transfer ribbon illustrating an exemplary transfer section, transfer portions, and non-transfer portions in accordance with embodiments of the invention.

As mentioned above, the transfer laminating section 104 of the device 100 is generally configured to laminate a transfer section of the transfer layer 122 to the surface 154 of a substrate 146. FIG. 7 is a simplified top view of a transfer ribbon 108 illustrating an exemplary transfer section 160 in accordance with embodiments of the invention. In some embodiments, it is desirable to cover the entire surface 154 of the substrate 146 with the transfer layer 122, particularly when the transfer layer 122 is configured to provide protection to the surface 154 of the substrate 146, or an image printed to the transfer layer 122. Thus, in some embodiments, the transfer section 160 substantially matches the surface 154 of the substrate 146.

Figure 8:
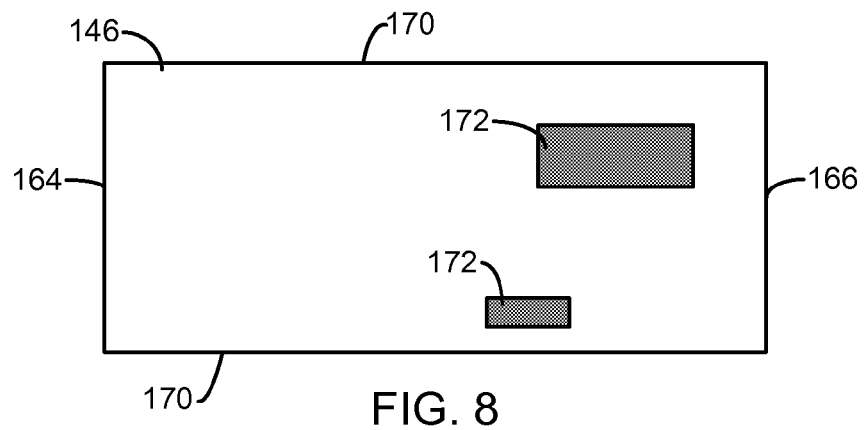
FIG. 8 is a simplified top view of a substrate in accordance with embodiments of the invention.

In some embodiments, the substrate 146 includes a leading edge 164 and a trailing edge 166, as shown in the simplified top view of FIG. 8. The leading edge 164 and trailing edge 166 are determined based on the feed direction 156, in which the substrate 146 is fed along the processing path 148, as shown in FIG. 6. In some embodiments, the substrate 146 also includes opposing side edges 170 extending between the leading and trailing edges 164 and 166.

In some embodiments, the transfer section 160 includes edges corresponding to the edges of the substrate 146. Accordingly, in some embodiments, the transfer section 160 includes a leading edge 164' corresponding to the leading edge 164 of the substrate 146, a trailing edge 166' corresponding to the trailing edge 166 of the substrate 146, and opposing side edges 170' corresponding to the side edges 170 of the substrate 146, as shown in FIG. 7.

In some embodiments, the substrate 146 includes one or more features 172 (FIG. 8), to which the transfer layer 122 should not be laminated. Exemplary features 172 include embedded circuitry (e.g., an integrated circuit chip), an electrical contact, a magnetic stripe, a signature panel, a holographic image, or other feature that should not be covered by the transfer layer 122.

As discussed above, it may be desirable to avoid covering the entire surface 154 of the substrate 114 with the transfer section 160 in order to avoid covering various features 172 (FIG. 8) of the substrate 146 with the transfer layer 122. Some embodiments of the invention operate to selectively remove portions of the transfer section 160 corresponding to the features 172 of the substrate 114, thereby preventing the lamination of the transfer layer 122 over the features 172 of the substrate 146.

Additionally, it is desirable that the transfer section 160 is cleanly removed (i.e., without edge flash) from the carrier layer 104 of the transfer ribbon 108 while portions of the transfer layer 122 that adjoin the edges of the transfer section 160 remain adhered to the carrier layer 124 following the transfer lamination process. As mentioned above, the more durable the transfer layer 122, the more difficult it is to get the transfer section 160 to cleanly fracture from the portions of the transfer layer 122 that are to remain adhered to the carrier layer 124. The durability of the transfer layer 122 may be determined by the type of resin used, the thickness of the transfer layer 122, the thickness of a protective layer 130, or other property of the transfer layer 122. Embodiments of the invention provide a method for reducing tears in the transfer layer 122 during transfer lamination processes.

Figure 9:
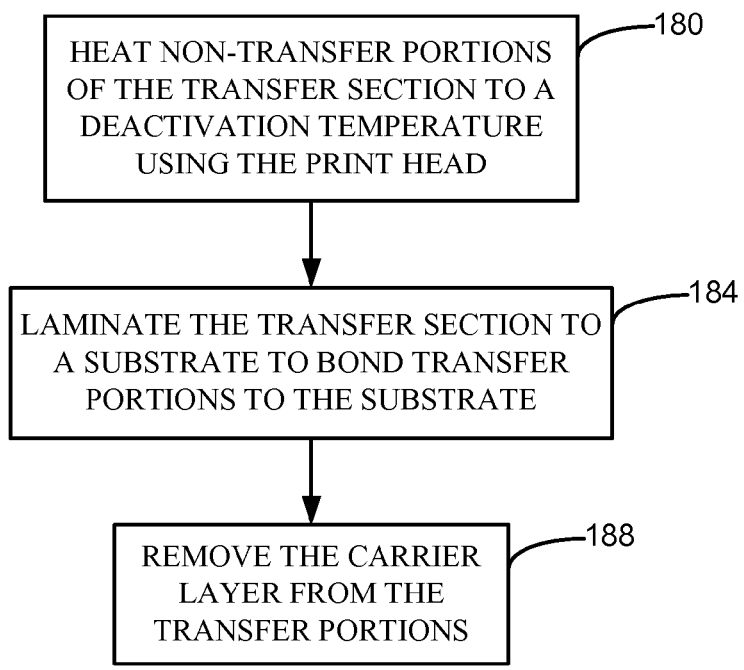
FIG. 9 is a flowchart illustrating a method of laminating a transfer section of a transfer layer to a substrate in accordance with embodiments of the invention.

FIG. 9 is a flowchart illustrating a method of laminating a transfer section 160 of a transfer layer 122 to a substrate 146 using embodiments of the reverse-image transfer printing device 100 described above. In some embodiments, the device 100 includes a transfer ribbon 108 comprising the transfer layer 122 attached to a carrier layer 124, a print ribbon 106, a print head 132 configured to transfer print material from the print ribbon 106 to the transfer layer 122, and a laminating device 140, as described above.

At 180 of the method, non-transfer portions 182 of the transfer section 160 are heated to a deactivation temperature using the print head 132. Thus, the transfer section 160 of the transfer layer 122 includes one or more heated non-transfer portions 182 following the heating step 180, as shown in FIG. 7. Each pixel of area of the transfer section 160 heated during step 180 to the deactivation temperature constitutes one non-transfer portion 182. Accordingly, several non-transfer portions 182 are contained within each of the boxes in FIG. 7 identified as non-transfer portions 182.

In some embodiments, the heating step 180 is performed by selectively activating individual heating elements 136 of the print head 132 in accordance with conventional printing techniques, as illustrated in FIG. 5. In some embodiments, the deactivation temperature to which the non-transfer portions 182 of the transfer section 160 reach in response to step 180 is greater than the temperature reached by portions of the transfer section 160 in response to the heating of the print ribbon 106 to the print temperature during a process of printing an image to the transfer layer 122. In some embodiments, the deactivation temperature is in the range of 160-300° C.

In some embodiments, the heating step 180 involves positioning the heating elements 136 over the non-transfer portions 182 for a longer duration as compared to when performing a print operation. In some embodiments, this allows the non-transfer portions to reach the desired deactivation temperature.

In some embodiments, this heating of the non-transfer portions 182 operates to either bond the non-transfer portions to the carrier layer 124, or deactivate the adhesive in the transfer layer 122 in such a manner that the non-transfer portions do not bond to the surface 154 of the substrate 146 during a transfer lamination process. In some embodiments, the heating step 180 modifies or deactivates the release layer 128 (FIG. 3) between the transfer layer 122 and the carrier layer 124, which allows the transfer layer 122 to bond to the carrier layer 124.

Thus, while the non-transfer portions 182 of the transfer layer 122 may be heated in accordance with conventional printing techniques using the print head 132, the heating elements 136 that are activated during the heating step 180 are energized to a greater degree than during a printing process in order to heat the non-transfer portions 182 to the deactivation temperature. In some embodiments, the heating elements 136 are heated to a higher temperature through the supply of more energy (i.e., current), as compared to the energy supplied to the active heating elements 136 necessary to heat the print ribbon 106 to the print temperature for a printing process. The additional energy to the activated heating elements 136 increases the heat generated by the heating elements 136 to provide the desired heating of the non-transfer portions 182 to the deactivation temperature.

In some embodiments, the duration the activated heating elements 136 are maintained over the non-transfer portions 182 during the heating step 180 is longer than the duration that the activated heating elements 136 are maintained over the transfer layer 122 during a printing process. This allows the heating elements 136 to transfer more heat to the non-transfer portions 182 than would normally be transferred during a printing process.

At 184 of the method, the transfer section 160 is laminated to a substrate 146 using the laminating device 140, which bonds transfer portions 186 to the substrate 146. In some embodiments of the laminating step 184, both the non-transfer portions 182 and the transfer portions 186 are heated using the laminating device 140, as shown in FIG. 6. In some embodiments, the transfer portions 186 correspond to the entire transfer section 160 less the non-transfer portions 182, as shown in FIG. 7.

At 188 of the method, the carrier layer 124 is removed from the transfer portions 186 bonded to the substrate 146, and the non-transfer portions 182 remain attached to the carrier layer 124, as shown in FIG. 6. Thus, only the transfer portions 186 of the transfer section 160 are bonded to the surface 154 of the substrate 146 following step 188.

Figure 10:
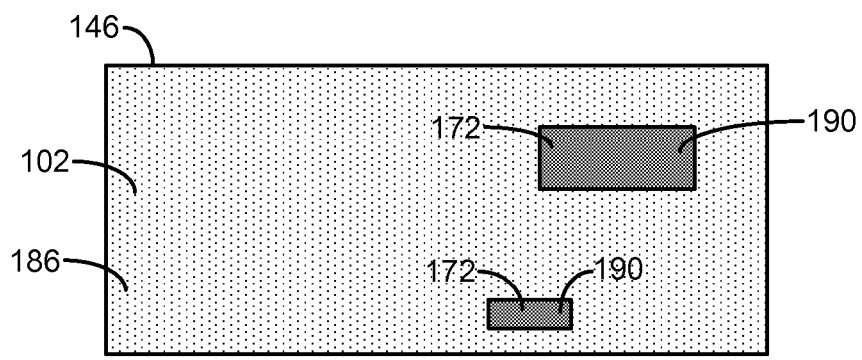
FIG. 10 is a simplified top view of the processed substrate in accordance with embodiments of the invention.

In some embodiments, openings 190 are formed in the bonded transfer section 160 that correspond to the non-transfer portions 182 that remain attached to the carrier layer 124 following step 188. In some embodiments, the openings 190 correspond to the features 172 of the substrate 146, such as those discussed above with reference to FIG. 8, as shown in the simplified top view of the processed substrate 146 provided in FIG. 10. As a result, embodiments of the method operate to remove select portions of the transfer section 160 of the transfer layer 122 to create openings in the transfer section 160 bonded to the substrate 146.

In some embodiments, the non-transfer portions 182 adjoin and extend along an edge of the transfer section 160, such as the leading edge 164', the trailing edge 166', and/or one or both of the side edges 170', as shown in FIG. 7. In some embodiments, these non-transfer portions 182 assist in ensuring a clean transfer of the transfer section 160 to the substrate during steps 184 and 188.

Figure 4:
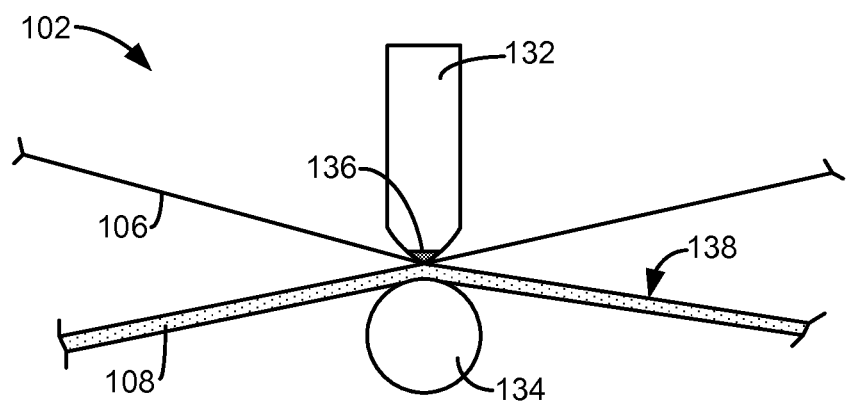
FIGS. 4 and 5 respectively are simplified side and front views of a printing section of the device of FIG. 1 in accordance with embodiments of the invention.
Figure 5:
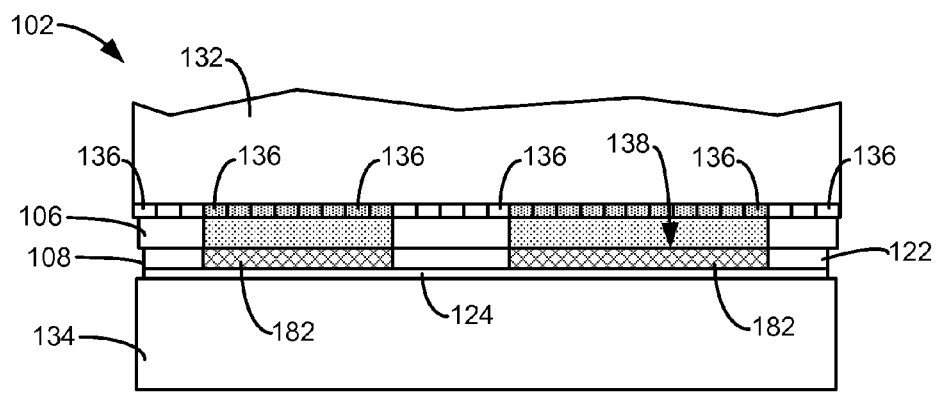

In some embodiments, step 180 involves heating the non-transfer portions 182 through the print ribbon 106 using the print head 132, as shown in FIG. 4. In some embodiments, print material is not transferred from the print ribbon 106 to the non-transfer portions 182 during step 180. In some embodiments, the print ribbon 106 includes a blank panel 192, as shown in FIG. 2. The blank panel 192 does not contain print material that is transferable to the non-transfer portions 182 of the transfer layer 122 in response to heating the blank panel 192 during the heating step 180. Accordingly, in some embodiments, the blank panel 192 is moved between the print head 132 and the platen 134, and the non-transfer portions 182 are heated by the print head 132 through the blank panel 192 during the heating step 180.

In accordance with other embodiments, print material is transferred from the print ribbon 106 to the non-transfer portions 182 during the heating step 180. In accordance with this embodiment, one of the print panels 118 (FIG. 2) of the print ribbon 106 may be positioned between the print head 132 and the platen 134 during the heating step 180.

In some embodiments, an image is printed on the transfer portions 186 using the print head 182, prior to steps 184 and 188 of the method. In some embodiments, the image is printed to the transfer section 160 before the heating step 180. In some embodiments, the image is printed in accordance with conventional techniques, such as those described above.

Figure 11:
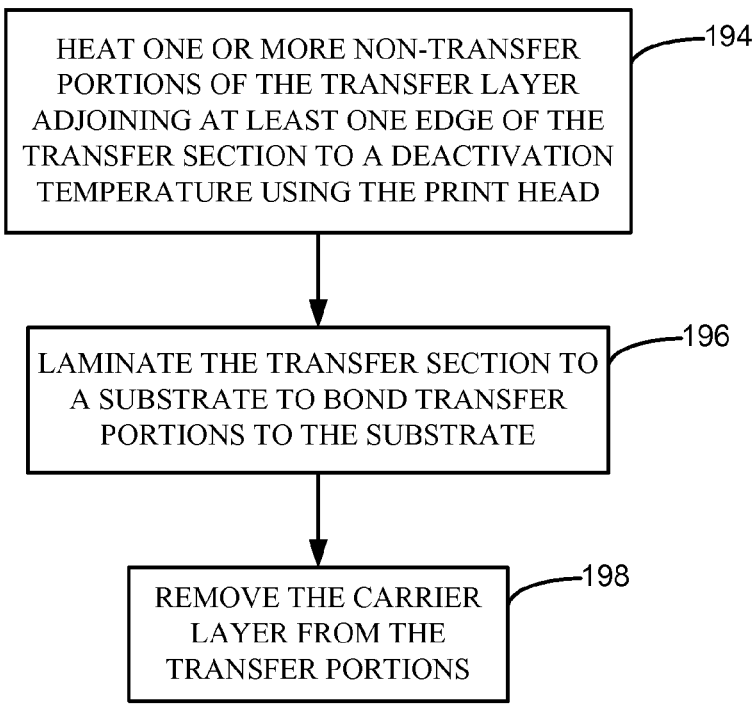
FIG. 11 is a flowchart illustrating a method of laminating a transfer section of a transfer layer to a substrate in accordance with embodiments of the invention.
Figure 12:
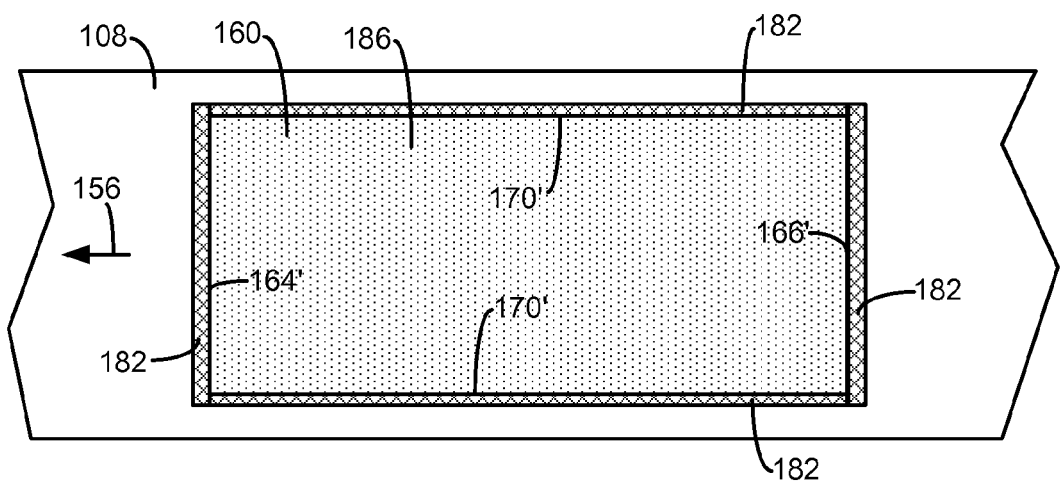
FIG. 12 is a simplified top view of a transfer ribbon illustrating exemplary non-transfer portions, and transfer portions in accordance with embodiments of the invention.

FIG. 11 is a flowchart illustrating embodiments of a method of laminating a transfer section 160 of a transfer layer 122 to a substrate 146 using a reverse-image transfer printing device 100 formed in accordance with one or more embodiments described above. At 194 of the method, one or more non-transfer portions 182 of the transfer layer 122 adjoining at least one edge of the transfer section 160 are heated to a deactivation temperature using the print head 132. Thus, embodiments of step 194 include heating a non-transfer portion 182 adjoining the leading edge 164' of the transfer section 160, a non-transfer portion 182 adjoining the trailing edge 166' of the transfer section 160, and/or a non-transfer portion 182 adjoining one or both of the side edges 170' of the transfer section 160, as shown in FIG. 12, which is a simplified top view of a transfer ribbon 108 in accordance with embodiments of the invention.

Techniques used to perform the heating step 194 are in accordance with those described above regarding the heating step 180. In general, the controller 101 of the device 100 controls the print head 132 to activate the heating elements 136 corresponding to the desired non-transfer portion 182 to heat the desired non-transfer portions 182 to the deactivation temperature.

At 196 of the method, the transfer section 160 is laminated to a substrate 146 to bond transfer portions 186 to the substrate 146, as shown in FIG. 6. In some embodiments of the laminating step 196, both the non-transfer portions 182 and the transfer portions 186 are heated using the laminating device 140, as shown in FIG. 6.

In some embodiments, the transfer portions 186 may comprise the entire transfer section 160. In other embodiments, non-transfer portions 182 are formed in the transfer section 160 in accordance with step 180 of the method of FIG. 9, prior to the lamination step 196. The non-transfer portions 182 within the transfer section are not bonded to the substrate 146 during the laminating step 196. Thus, in some embodiments, the method of FIG. 11 includes performing the heating step 180 prior to the laminating step 196. Likewise, embodiments of the method of FIG. 9 include performing the heating step 194 prior to the laminating step 184.

At 198 of the method, the carrier layer 124 is removed from the transfer portions 186, as shown in FIG. 6. The one or more non-transfer portions 182 formed in step 194 that adjoin one of the edges of the transfer section 160 remain adhered to the carrier layer 124 following step 198. In some embodiments, the formation of such non-transfer portions 182 assists in preventing or reducing tearing of the transfer layer 122, particularly when the transfer layer 122 includes a relatively thick or highly durable protective layer 130, as discussed above. As a result, substrates 146 processed in accordance with the method of FIG. 11 are less prone to defects caused by tearing of the transfer layer 122 at one of the edges of the transfer section 160 during the removing step 198.

In some embodiments, the heating step 194 involves heating the non-transfer portions 182 through the print ribbon 106 in accordance with the techniques described above with regard to the heating step 180.

Although the present invention has been described with reference to preferred embodiments, workers skilled in the art will recognize that changes may be made in form and detail without departing from the spirit and scope of the invention.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

What is claimed is:

1. A method of laminating a transfer section of a transfer layer to a substrate using a reverse-image transfer printing device, which includes a transfer ribbon comprising the transfer layer attached to a carrier layer, a print ribbon, a print head configured to transfer print material from the print ribbon to the transfer layer, and a laminating device, the method comprising:

heating non-transfer portions of the transfer section to a deactivation temperature using the print head; and laminating the transfer section to the substrate comprising:

heating the non-transfer portions and transfer portions of the transfer section using the laminating device; and bonding the transfer portions to the substrate using the laminating device; and removing the carrier layer from the transfer portions, wherein the non-transfer portions remain attached to the carrier layer.

2. The method according to claim 1, wherein heating non-transfer portions of the transfer section comprises heating the non-transfer portions through the print ribbon using the print head.

3. The method according to claim 2, wherein heating non-transfer portions of the transfer section comprises heating the non-transfer portions through the print ribbon using the print head without transferring print material from the print ribbon to the non-transfer portions.

4. The method according to claim 3, wherein:
the print ribbon includes a blank panel; and
heating non-transfer portions of the transfer section comprises heating non-transfer portions of the transfer section through the blank panel.

5. The method according to claim 2, wherein heating non-transfer portions of the transfer section comprises transferring print material from the print ribbon to the non-transfer portions.

6. The method according to claim 1, comprising printing an image on the transfer portions using the print head comprising:

heating portions of the print ribbon to a print temperature using the print head; and transferring print material from the print ribbon to the transfer section in response to heating portions of the print ribbon;

wherein the deactivation temperature is greater than the print temperature.

7. A The method according to claim 1, wherein:
the non-transfer portions of the transfer section correspond to features of the substrate selected from the group consisting of embedded circuitry, an electrical contact, a magnetic stripe, a signature panel, and a holographic image; and the transfer section laminated to the substrate includes openings over the one or more features of the substrate corresponding to the non-transfer portions.

8. The method according to claim 1, wherein:
the substrate includes a leading edge, a trailing edge opposite the leading edge, and first and second opposing side edges extending between the leading and trailing edges; and the non-transfer portions of the transfer section are selected from the group consisting of a leading edge portion of the transfer section corresponding to the leading edge of the substrate, a trailing edge portion of the transfer section corresponding to the trailing edge of the substrate, and side edge portions of the transfer section corresponding to the side edges of the substrate.

9. The method according to claim 1, further comprising heating a portion of the transfer layer that adjoins an edge of the transfer section to the deactivation temperature using the print head.

10. A method of laminating a transfer section of a transfer layer to a substrate using a reverse-image transfer printing device, which includes a transfer ribbon comprising the transfer layer attached to a carrier layer, a print ribbon, a print head configured to transfer print material from the print ribbon to the transfer layer, and a laminating device, the method comprising:

heating one or more non-transfer portions of the transfer layer adjoining at least one edge of the transfer section to a deactivation temperature using the print head; and laminating the transfer section to the substrate comprising:

heating the transfer section using the laminating device; and bonding transfer portions of the transfer section to the substrate using the laminating device; and removing the carrier layer from the transfer portions, wherein the non-transfer portions remain attached to the carrier layer.

11. The method according to claim 10, wherein:
the transfer section includes a leading edge, a trailing edge opposite the leading edge, and first and second opposing side edges extending between the leading and trailing edges; and the one or more non-transfer portions are selected from the group consisting of a leading edge portion adjoining the leading edge of the transfer section, a trailing edge portion adjoining the trailing edge of the transfer section, and side edge portions each adjoining one of the side edges of the transfer section.

12. The method according to claim 10, wherein heating one or more non-transfer portions of the transfer layer comprises heating the one or more non-transfer portions through the print ribbon using the print head.

13. The method according to claim 12, wherein heating one or more non-transfer portions of the transfer layer comprises heating the one or more non-transfer portions through the print ribbon using the print head without transferring print material from the print ribbon to the non-transfer portions.

14. The method according to claim 10, wherein:
the method comprises heating non-transfer portions of the transfer section to the deactivation temperature using the print head; and laminating the transfer section comprises:
heating the non-transfer portions and the transfer portions of the transfer section using the laminating device; and bonding the transfer portions to the substrate using the laminating device; and the non-transfer portions of the transfer section remain attached to the carrier layer following removing the carrier layer from the transfer portions.

* * * * *